(12) United States Patent
Keita et al.

(10) Patent No.: US 11,810,468 B2
(45) Date of Patent: Nov. 7, 2023

(54) SYSTEM AND METHOD FOR DEMONSTRATING AN OPTICAL DISORDER

(71) Applicant: ESSILOR INTERNATIONAL, Charenton-le-Pont (FR)

(72) Inventors: Gabriel Keita, Dallas, TX (US); John Guerra, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 295 days.

(21) Appl. No.: 16/745,908

(22) Filed: Jan. 17, 2020

(65) Prior Publication Data
US 2020/0234607 A1    Jul. 23, 2020

(30) Foreign Application Priority Data

Jan. 21, 2019 (EP) ..................................... 19305076

(51) Int. Cl.
*G02C 7/06* (2006.01)
*G02C 7/02* (2006.01)
*G09B 19/00* (2006.01)

(52) U.S. Cl.
CPC ............ *G09B 19/00* (2013.01); *G02C 7/027* (2013.01); *G02C 7/063* (2013.01); *G02C 7/066* (2013.01)

(58) Field of Classification Search
CPC ........ G02C 7/061; G02C 7/066; G02C 7/027; G02C 7/088; A61B 3/02; A61B 3/028; A61B 3/09; A61B 3/18
USPC ..................... 351/203, 222, 231, 246, 54, 55
See application file for complete search history.

(56) References Cited

U.S. PATENT DOCUMENTS

| | | | | |
|---|---|---|---|---|
| 772,196 | A * | 10/1904 | Ward ........................ | G02C 7/06 351/54 |
| 3,245,745 | A * | 4/1966 | Hancock ................... | G02C 7/06 351/159.41 |
| 4,292,030 | A * | 9/1981 | Lobdell ................... | G09B 19/00 434/262 |
| 5,459,133 | A | 10/1995 | Neufeld | |
| 5,495,305 | A * | 2/1996 | Martin ....................... | A61F 9/00 351/159.75 |

(Continued)

OTHER PUBLICATIONS

Johnson & Johnson Surgical Vision, Inc., Tecnis Vision Simulator, <http://www.tecnisvisionsimulator.com/>, 2018.

(Continued)

*Primary Examiner* — Zachary W Wilkes
(74) *Attorney, Agent, or Firm* — NIXON & VANDERHYE

(57) ABSTRACT

A method for demonstrating an optical disorder includes providing two ophthalmic lenses in a first position relative to each other. Each lens includes a first vision zone and a second vision zone. The first vision zone includes a distance vision zone having a distance vision reference point and a power of between about −1.00 Diopters and −4.00 Diopters. The second vision zone includes a near vision zone having a near vision reference point and a power of between about +1.00 Diopters and about +4.00 Diopters. Each lens includes an Add power of between +2.00 Diopters and +3.25 Diopters; the ophthalmic lenses are repositioned to a second position relative to each other, so the distance vision zone of each lens is viewable by a wearer through the near vision zone and the near vision zone of each lens is viewable by a wearer through the distance vision zone.

6 Claims, 6 Drawing Sheets

(56) References Cited

U.S. PATENT DOCUMENTS

| | | | | |
|---|---|---|---|---|
| 5,677,751 A * | 10/1997 | Gerber | | G02C 13/005 351/204 |
| 5,984,473 A * | 11/1999 | Livnat | | G02C 7/061 351/204 |
| 6,213,603 B1 | 4/2001 | Altheimer et al. | | |
| 7,222,957 B1 * | 5/2007 | Allred | | G02C 7/06 351/54 |
| 7,631,969 B2 * | 12/2009 | Shinohara | | G02C 7/086 351/159.42 |
| 7,832,861 B1 * | 11/2010 | Lee | | G02C 7/061 351/159.42 |
| 8,029,131 B2 * | 10/2011 | Assia | | G02C 5/001 351/131 |
| 8,356,896 B2 * | 1/2013 | Esser | | A61B 3/0025 351/200 |
| 2008/0013038 A1 | 1/2008 | Guilloux | | |
| 2011/0184830 A1 | 7/2011 | Guilloux et al. | | |
| 2011/0187993 A1 | 8/2011 | Alonso Fernández et al. | | |
| 2011/0317127 A1 * | 12/2011 | Suzuki | | G02C 7/061 351/159.06 |
| 2012/0300172 A1 * | 11/2012 | Berthezene | | G02C 7/028 351/159.75 |
| 2013/0250191 A1 | 9/2013 | Blum et al. | | |
| 2014/0211152 A1 * | 7/2014 | Colas | | G02C 7/024 351/159.75 |
| 2015/0049301 A1 * | 2/2015 | Krall | | G02C 7/065 351/159.42 |
| 2015/0153589 A1 | 6/2015 | Meschenmoser et al. | | |
| 2017/0115510 A1 * | 4/2017 | Kaga | | G02C 7/068 |
| 2017/0269379 A1 | 9/2017 | Arieli et al. | | |
| 2019/0258081 A1 * | 8/2019 | Yanari | | G02C 7/06 |

OTHER PUBLICATIONS

VersantHealth, Vision Loss Simulator, <https://www.versanthealth.com/visionloss/>, 2019.

MyEyeDr, Vision Simulator, <https://www.myeyedr.com/vision-simulator>, 2019.

EP Search Report, dated Jul. 12, 2019, from corresponding EP application No. 19305076.

Communication pursuant to Article 94(3) EPC issued in European Patent Application No. 19 305 076.2 dated Jan. 23, 2023.

* cited by examiner

SYSTEM AND METHOD FOR DEMONSTRATING AN OPTICAL DISORDER

FIELD OF THE DISCLOSURE

The present disclosure relates generally to a system and method for demonstrating an optical disorder. More particularly, this present disclosure pertains to a system and method for demonstrating presbyopia.

BACKGROUND

Presbyopia is a condition associated with the aging of the human eye that results in a progressively worsening ability to focus clearly on close objects. Many people notice presbyopia around the age of 45, and as well as focusing difficulties, some also experience eye strain and headaches. In fact, presbyopia affects virtually every person over the age of 45. According to Jobson Optical Database, 93% of people 45 and over are presbyopic. Presbyopia entails the progressive loss of amplitude of accommodation that occurs with aging. It is caused by hardening of the lens of the eye, causing the eye to focus light behind rather than on the retina when looking at close objects. Symptoms include difficulty reading small print, having to hold reading material farther away, headaches, and eyestrain. This is because the lens of the eye changes its shape and length to focus on close items, but as the lens ages, its elasticity deteriorates, causing a gradual decline in the ability of the eyes to focus on close up objects.

Although there is no proven prevention or cure of presbyopia, there are a number of options for minimizing its impact. Some individuals may choose to correct one eye for close up objects and one for further away. This is called "monovision." The advantage of this includes very clear distance vision and very clear near vision, although some people feel uncomfortable with the decreased depth perception and occasional fatigue that can occur when doing a specialized task for extended periods. Other more common treatment management options include eye glasses such as reading glasses or progressive lenses, which have a higher focusing power in the lower portion of the lens. Such lenses are typically prescribed and dispensed by opticians and sold by ophthalmic sales personnel. Diagnosis is typically done by an eye examination conducted by an optician. For opticians and ophthalmic sales personnel who are not themselves presbyopes, they may have difficulties to understand or to empathize with the symptoms experienced by presbyopes.

A current solution to help such non-presbyopes to better understand presbyopia is to use drugs, such as atropine, that will last for several hours. Atropine is a non-selective anti-muscarinic blocker. This drug can cause short-term discomfort such as light sensitivity and blurred near vision. Light sensitivity is usually transient in nature, and a progressive lens will take care of the near vision. Longer-term complications can include damage to the retina and lens and pre-senile presbyopia. Atropine produces a paralytic effect on the ciliary muscle, causing loss of accommodation on the iris tissue causing pupil dilatation. Topical atropine, which temporarily paralyzes the accommodation reflex wears off in 1-14 days, depending on the subject and the concentration used. Accommodation, accommodative amplitude, and accommodation reflex refers to the ability of the eye to increase its refractive power of the crystalline lens in order to focus near objects on the retina. Adler's Physiology of the Eye, which is incorporated herein by reference, discloses that the human accommodative amplitude declines with age such that accommodation is substantially eliminated by the age of 50 to 55. Accommodative ability, as defined by U.S. Pat. No. 5,459,133 to Neufeld and incorporated in its entirety herein by reference for background information, is the capacity of the eye to focus for near vision by changing the shape of the lens to become more convex.

Other drugs are also available, such as, but not limited to, isopto homatropine, phenylephrine, and cyclopentolate. These drugs will have a much shorter effect on a patient, as their results will wear off in few hours. Even when using drugs with a shorter effective time, the subject is prevented from working in optimal conditions for several hours during the drug test. These drugs can incapacitate the subject. Further, most of the drugs used to dilate a pupil also have an effect on the accommodation reflex. These drugs have been used in optician schools, as a tool to help students experience the loss of accommodation associated with presbyopia, but since fewer than 40% of opticians are actually certified to dispense lenses, only a small fraction will experience the effect of losing the accommodation in an educational environment.

In addition to drugs, several presbyopia simulators exist to allow non-presbyopes to experience presbyopia. For example, an online vision simulator tool is available from Johnson & Johnson (http://www.tecnisvisionsimulator.com/). Another vision loss simulator is available from Versant Health (https://www.versanthealth.com/visionloss/). Yet another online vision simulator is available from MyEyeDr (https://www.myeyedr.com/eye-care/vision-matters), and a multi-focal vision simulator is available from MeDownick Laser Clinic (http://www.medownicklasereyesurgery.com.au/vision-simulator/). There are also applications that can simulate various vision problems, such as "iSee, the vision simulator" which is available for use with mobile cell devices, such as i-phones. These simulators require a mobile device and use either stock photographs or, in the case of mobile phone applications, photographs stored on the mobile device. None of these simulators utilize a physical object, such as a pair of eyeglasses or a lorgnette, that can be placed directly over a subject's eyes. Further, these simulations do not allow a subject to experience the world around them as if they were affected by presbyopia.

What is needed then is a system and method to make it easier, particularly for non-presbyope personnel in the optical field, to better understand the symptoms experienced by presbyopes, which may, in turn, help them better understand the benefits of premium progressive lenses, and to convey the desirability of such premium lenses to their patients.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE DISCLOSURE

Presented herein is an optical article that comprises an upper portion and a lower portion, wherein the lower portion comprises a first vision zone and the upper portion comprises a second vision zone, wherein the first vision zone comprises a distance vision zone, and the second vision zone comprises a near vision zone.

A method of using an optical article to demonstrate presbyopia is provided herein. The method involves demonstrating an optical disorder by a) providing two ophthalmic lenses in a first position relative to each other, wherein each lens comprises a first vision zone and a second vision zone, wherein the first vision zone comprises a distance vision zone having a distance vision reference point and a power of between about −1.00 Diopters and −4.00 Diopters, and the second vision zone comprises a near vision zone having a near vision reference point and a power of between about +1.00 Diopters and about +4.00 Diopters, and wherein each lens comprises an Add power of between +2.00 Diopters and +3.25 Diopters; b) re-positioning the ophthalmic lenses to a second position relative to each other, such that the distance vision zone of each lens is viewable by a wearer through the near vision zone, and the near vision zone of each lens is viewable by a wearer through the distance vision zone; and c) providing the ophthalmic lenses to the wearer.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION OF THE DISCLOSURE

Figure 1:
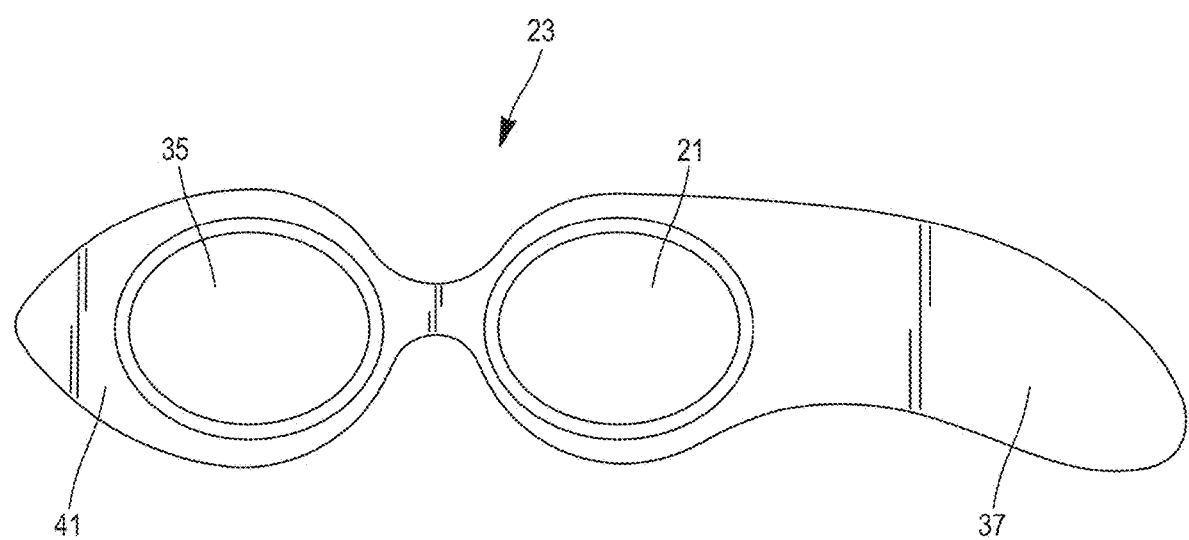
FIG. 1 illustrates a lorgnette comprising at least one ophthalmic lens.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

Definitions

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Herein, the term "lens" means an organic or inorganic glass lens, preferably an organic lens, comprising a lens substrate having one or more surfaces which may be coated with one or more coatings of various natures.

Herein, the term "Add" means the added magnifying power applied to a bottom part or in the lower half of the distance prescription of multifocal lenses to correct presbyopia of the multifocal lens. The number appearing in this section of the prescription is always a "plus" power, even if it is not preceded by a plus sign. Generally, it will range from about +0.75 to about +3.00 D and will be the same power for both eyes. This "Add" restores near vision for adults with presbyopia.

Herein, the term "Diopter" means a measure of the refractive power of an optical system. Particularly, it is a unit of measurement of the optical power of a lens or curved mirror, which is equal to the reciprocal of the focal length measured in meters (1 diopter=1 m$^{-1}$). For example, a 3 Diopter lens brings parallel rays of light to focus at ⅓ meter.

Herein, and according to standard ISO 13666:2012, the term "Fitting Cross" or "Fitting Point" means a reference point for positioning a lens in front of the eye of a wearer, the position of which is typically predefined by a manufacturer of the lens. The position of the fitting point on the lens is predetermined and known. The fitting height then corresponds to the vertical distance that separates the fitting point from a horizontal tangent passing through the lower point of the periphery of the lens.

Herein, the term "progressive" means progressive lenses. Such lenses may also be called multifocal lenses, progressive addition lenses (PAL), varifocal lenses, progressive power lenses, graduated prescription lenses, and progressive spectacle lenses. Such lenses are corrective lenses used in eyeglasses to correct presbyopia and other disorders of accommodation. They are characterized by a gradient of increasing lens power, added to the wearer's correction for other refractive errors. The gradient starts at the wearer's distance prescription at the top of the lens and reaches a maximum addition power, or the full reading addition, at the bottom of the lens. The length of the progressive power gradient on the lens surface depends on the design of the lens, with a final addition power typically being between about +0.75 and about +3.50 Diopters. The addition value prescribed depends on the level of presbyopia of the patient. In general the greater the presbyopia condition, the higher the addition. Compared to single vision lenses, progressive lenses have the power required for a presbyopic patient to have clear vision at all viewing distances, typically adjusted by tilting the head slightly. Progressive addition lenses avoid the discontinuities (image-jumps) sometimes found with bifocal and trifocal lenses.

Herein, the term "Segment Height," also known as "Seg Height" or "SH," is the vertical measurement in millimeters from the bottom of the lens in a wearer's frames, to the beginning of the progressive addition on a progressive lens, or the top line of a lined bifocal. Segment height does not apply to single vision lenses.

Herein, the term "Sphere" means the amount, in diopters, of correction a lens must provide to sharpen a wearer's vision to an acceptable level (usually 20/20). The minus sign for sphere means that a particular prescription is for near-sightedness (myopia). A plus sign for a particular prescription means that the correction is for farsightedness (hyperopia). The farther from zero, the greater the amount of correction is necessary.

An optical article and method for demonstrating an optical order, such as presbyopia, is described herein. The optical article and method is used to assist a non-presbyope, particularly non-presbyope opticians, dispensers, sales force personnel, and other non-presbyopes involved in the dispensing and selling of prescription lenses, to better experience the optical disorder experienced by presbyopes, due to a loss of accommodation, without the side effect of drugs to block the accommodative reflex.

Referring to FIG. 1, the invention described herein can be positioned in a lens receiving device such as, but not limited to, a simple lorgnette 23 that may be worn over or in front of prescription lenses, contact lenses, or a wearer's bare eyes. The invention proposed herein does not require the use of a computer or other device, or drugs or other chemicals that traditionally have negative side effects. The invention essentially simulates the effects of presbyopia for subjects who do not have presbyopia.

In one embodiment the lorgnette 23 comprises a first recess configured to receive an optical article, such as a first lens 35 and a second recess configured to receive an optical article such as a second lens 21. The lorgnette comprises a body 41 and a handle 37. The handle 37 and the body 41 are co-planar. The lorgnette 23 can be comprised of an acrylic (transparent) plastic, such as polycarbonate, polystyrene or methylmethacrylate, or metals, or even wood. Use of the lorgnette 23 by a wearer involves grasping the handle 37 of the lorgnette 23 with one hand and raising the lorgnette 23 to the height of the wearers' eyes such that the first lens 35 is positioned in front of or over a wearer's left eye and the second lens 21 is positioned in front of or over the wearer's right eye, and the wearer views objects through the lenses 21, 35 in a primary gaze direction, described below.

Although a lorgnette is depicted in FIG. 1 as the lens receiving device, other embodiments into which the first lens and the second lens may be placed include, but are not limited to, traditional eyewear such as eyeglasses frames, smart frames, and/or devices such as a vision testing apparatus, or as a component of other modalities described herein. Alternatively, the optical article described herein may be in the form of a patch. The patch is configured to be removably attached to the surface of a lens.

Figure 2A:
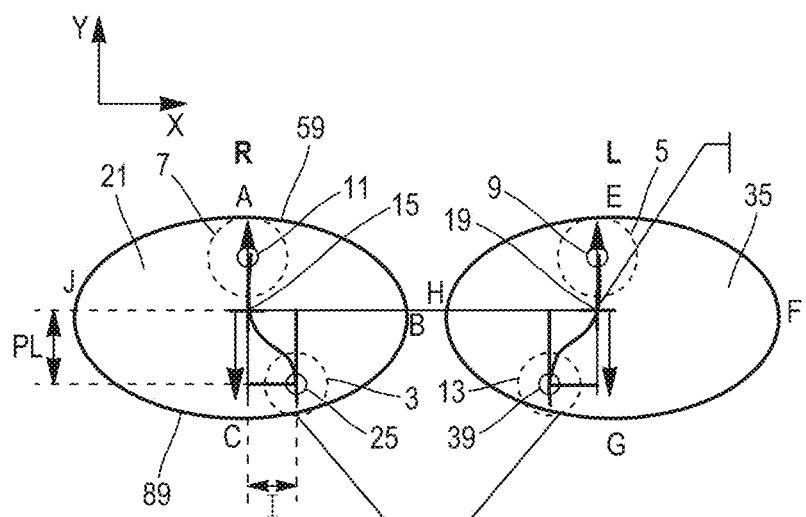
FIG. 2A illustrates two progressive ophthalmic lenses.

By way of background, progressive addition lenses, such as those illustrated in FIG. 2A, provide a smooth transition from distance vision correction to near vision correction, eliminating segment lines and allowing clear vision by a wearer at all distances, including intermediate (roughly arms' length). The lack of any abrupt change in power and the uniform appearance of the lens gives rise to the name "no-line bifocal." Ophthalmic progressive lenses allow a wearer to benefit from an optical power compensation that is adapted to various vision distances without changing spectacles. They may also correct other visual defects, such as astigmatism for example. A progressive ophthalmic lens has a variable power over the surface of the lens.

Referring to FIG. 2A, each of lenses 21, 35 is a progressive ophthalmic lens having a progressive spherical power addition, and includes, in its upper portion 59, a first vision zone comprising a distance vision zone (7, 5) the spherical power of which is suitable for the distance vision of a wearer, depending on the wearer's visual correction needs and, in its lower portion 89, a second zone comprising a near vision zone (3, 13), the spherical power of which is suitable for the near vision of the wearer. The distance vision zone (7, 5) has a distance vision having a first average power value, and the second vision zone (3, 13) for near vision has a second average power value. The difference between the first and second average power values is equal to the power addition of the lens.

The distance vision zone (7, 5) is indicated by the upper dotted circular section, and the near vision zone (3, 13) is indicated by the lower dotted circular section. In the first or original position illustrated in FIG. 2A, the distance vision zone (7, 5) has a predetermined power of between about −1.00 and about −4.00 Diopters. In particular, each of the progressive lenses 21, 35 has an average distance vision power of about −3.00 Diopters. Each lens 21, 35 further comprises an Addition or "Add power." In one aspect the progressive lenses 21, 35 can have an Add power in the range of between about +2.00 to about +3.25 with the corresponding negative power for the distance vision.

Between the distance vision zone and the near vision zone, the lenses 21, 35 may further comprise a third vision zone for intermediate vision (not shown), the curvature of which varies gradually and which is called the progression corridor (not shown). Each progressive lens 21, 35 comprises a fitting cross (15, 19). Each fitting cross is noted with a "+" sign and is a reference point for positioning each lens 35, 21 in front of the eye of a wearer, the position of which is predefined by the manufacturer of the lens, as described above.

The distance vision zone (7, 5) is centered on and surrounds a distance vision reference point (11, 9), the position of which is predetermined for a given lens by the manufacturer. Thus, the distance vision reference point is located within at least a portion of the distance vision zone. More particularly, the distance vision reference point is positioned substantially in the center of the distance vision zone. The near vision zone (3, 13) is centered on and surrounds a near vision reference point (25, 39), the position of which is predetermined for a given lens by the manufacturer. Thus, the near vision reference point is located within at least a portion of the near vision zone. More particularly, the near vision reference point is positioned substantially in the center of the near vision zone.

The distance vision zone (7, 5) and the near vision zone (3, 13) are separated by a distance called progression length ("PL"). The progression length PL may be defined as the vertical distance between the fitting cross (15, 19) and the position of the near vision reference point (25, 39) defined by the manufacturer of the lens. Other definitions may be adopted for the progression length PL. PL may be expressed relative to the prism reference point or to the distance vision reference point (15, 19) rather than relative to the fitting cross. The mean surface of the ophthalmic lens is defined as the surface equidistant at every point from the front and back faces of the lens. As illustrated to the upper left corner near FIG. 2A, the horizontal direction is considered to be perpendicular to the vertical direction, following, for example, a plumb line, as illustrated by the horizontal "X" and vertical "Y" axis. The vertical and horizontal directions of the lens are defined depending on the position of the lens under conditions of use by the wearer, in a chosen frame. The PL of the lens must be adjusted depending on the fitting height of the ophthalmic lens.

The fitting height of the ophthalmic lens corresponds to the height, relative to the lower edge of the rim of the frame into which the lenses 21, 35 are positioned, of the projection of the pupil of the wearer having a predetermined primary gaze direction onto a mean plane of this rim of the chosen frame, corresponding to a mean plane of the ophthalmic lens once fitted into the frame. This predetermined primary gaze direction corresponds to the gaze direction of the wearer under distance vision conditions. The PL of the lens is adjusted so that the near vision zone of the lens is included in the lens once edged and positioned in the chosen frame. Furthermore, the near vision zone may be positioned depending on visual habits of the wearer.

The inset "I" of the lens 21, 35 is defined as the horizontal offset between the distance vision reference point (15, 19) and the near vision reference point (25, 39). The inset I is also called "internal offset." At the distance vision reference point (15, 19), the lens 21, 35 has a first predetermined spherical power suitable for the distance vision of the wearer, whereas, at the near vision reference point (25, 39), it has a second predetermined spherical power suitable for the near vision of the wearer.

The power of the lens varies, preferably continuously, between said distance vision reference point (15, 19) and said near vision reference point (25, 39), along a curve called the "principal progression meridian line," (not shown) which passes through these two points. This principal progression meridian line passes through these three zones (distance vision, near vision, and intermediate vision (not shown)) in an overall vertical direction.

The direction of the wearer's gaze is a straight line belonging to a plane containing the point fixated by the wearer with his gaze and the rotation centers of the eyes. For one eye in particular, the gaze direction is defined as the straight line connecting the point fixated by the wearer with his gaze and the center of rotation of this eye. For distance vision, with a sighted point straight ahead at infinity, the direction of the gaze is horizontal. This direction of the gaze corresponds to the primary gaze direction ("PGD").

The progressive ophthalmic lens is especially defined by two principal optical quantities: the addition equal to the variation in power between the distance vision reference point (15, 19) and the near vision reference point (25, 39); and a "nominal power" equal to the power of said reference point (15, 19) for distance vision.

In order to provide the wearer with the greatest possible visual comfort, it is necessary to precisely position the distance vision and near vision zones of the two ophthalmic lenses with which the wearer is intended to be equipped so that the wearer looks through the distance vision zone (7, 5) when he is looking far away and through the near vision zone (3, 13) when he is carrying out a near vision visual task.

The relative position and the dimensions of these two distance and near vision zones thus depends on geometrico-physiognomic parameters of the wearer, such as the wearer's interpupillary distance for example, and the wearer's visual behavior. They also depend on geometric characteristics of the frame chosen by the wearer, especially the height of the rims of the frame, the base of the latter or the pantoscopic angle of the frame worn by the wearer. Although specific designs for the progressive lenses 21, 35 are described herein and illustrated in FIGS. 2A and 2B, in one aspect, any progressive lens design could be used for the optical article and method described herein.

Figure 2B:
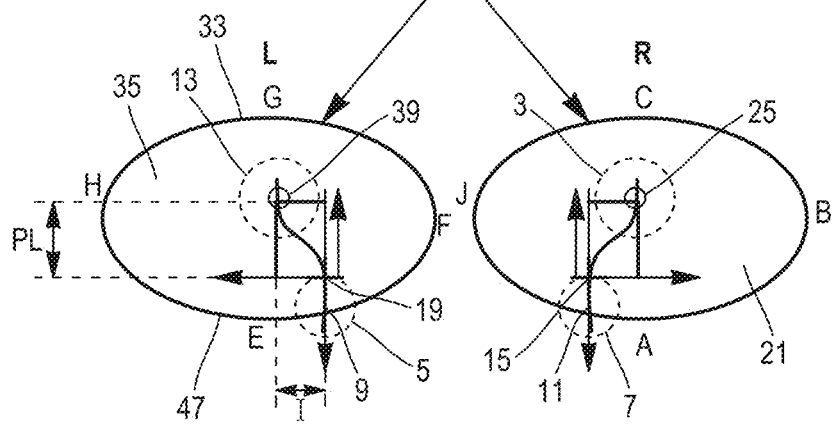
FIG. 2B illustrates the progressive lenses of FIG. 2A, wherein the lenses are inverted and exchanged.

Referring to FIG. 2B, the progressive lens 35 and the progressive lens 21 of FIG. 2A are illustrated after they have been re-positioned from a first position illustrated in FIG. 2A, to a second position. In particular, the lenses 35, 21 are flipped, rotated, or inverted upside down from a first position (FIG. 2A) to a second position (FIG. 2B) that is the inverse or mirror opposite of the first position. The first lens 35 and the second lens 21 are then further swapped or exchanged. The re-positioning of the lenses can be performed in any sequence. For example, the lenses can be inverted or flipped first and then exchanged, or vice versa. In yet another embodiment, the lenses 21, 35 can be re-positioned simultaneously, as described, or one at a time. The process of inverting and swapping the lenses can be done manually by hand or automatically by a machine or other apparatus. For instance, the lenses can be inverted and exchanged before placing the lenses in a lorgnette, frame, or other lens holding device. Alternatively, the lens orientation can be automatically inverted and exchanged using a pre-programmed smart frame, for example, or other virtual reality-related device. The manual process occurs before a wearer uses these lenses 21, 35 to view an object. The automated re-positioning of the lenses can occur before or during use by a wearer. For example, the lenses can be re-positioned or re-oriented in real time while a wearer is using the lenses to illustrate to the wearer the effect of demonstrating presbyopia using the re-positioned lenses.

After the lenses 21, 35 are exchanged and inverted, the lenses are provided to a wearer such that the first lens 35 is configured to be positioned in front of a wearer's left eye and the second lens 21 is configured to be positioned in front of a wearer's right eye. The re-positioning of the lenses is done in such a way that when the lenses are positioned in the second position, the re-positioned lenses allow for the distance vision to be viewable by a wearer through the near vision zone (5, 7) of the lens, and the near vision is viewable by a wearer through the distance vision zone (13, 3). Thus, the re-positioned progressive lenses comprise an upper portion 33 and a lower portion 47, wherein the lower portion comprises a first vision zone that comprises a distance vision zone, and the upper portion 33 comprises a second vision zone that comprises a near vision zone. In this second position, the distance vision zone has a plano power, and the near vision zone has a power of between about −1.00 Diopters and about −4.00 Diopters. In particular, the near vision zone has a power of about −3.00 Diopters.

When the lenses 21, 35 are in use by a wearer, in order for a wearer to see clearly through the near vision zone (3, 13) of the lens (21, 35), an object will have to be farther away from a wearer's eyes in order for the wearer to clearly see the object. This results in the wearer experiencing a "short arm syndrome" or "short arm effect" of a presbyopic wearer, since an object or fine print, for example, must be held further and further away to focus. This helps for a while, but eventually the arms become "too short," and reading correction in the form of reading glasses, bifocals or contact lenses is needed for close work. In order to allow an object to be seen clearly, the distance between the object and the eye of the wearer will be slightly greater than the distance of a full extended arm when the subject is looking through the near vision area. The invention described herein was tested by six non-presbyope subjects, and all of the subjects experienced the "short arm effect," as described above, after using the progressive lens design described herein, particularly that described in FIG. 2B. Each of the six non-presbyope subjects experienced the "short arm effect" when trying to reach an object that was clearly farther away than the full extension of their arm.

Thus, a method for demonstrating an optical disorder is provided herein. The method involves providing two ophthalmic lenses 21, 35 in a first position relative to each other. Each of these lenses 21, 35 comprises a first vision zone and a second vision zone. The first vision zone comprises a distance vision zone having a distance vision reference point and a power of between about −1.00 Diopters and −4.00 Diopters, and the second vision zone comprises a near vision zone that has a near vision reference point and a power of between about +1.00 Diopters and about +4.00 Diopters. Each lens comprises an Add power of between about +2.00 Diopters and about +3.25 Diopters. After providing said progressive lenses, the lenses are re-positioned or re-oriented to a second position relative to each other (FIG. 2B), such that the distance vision zone of each lens is viewable by a wearer through the near vision zone and the near vision zone of each lens is viewable by a wearer through the distance vision zone. The lenses 21, 35 are then provided to a wearer for use in order to demonstrate presbyopia.

Figure 3A:
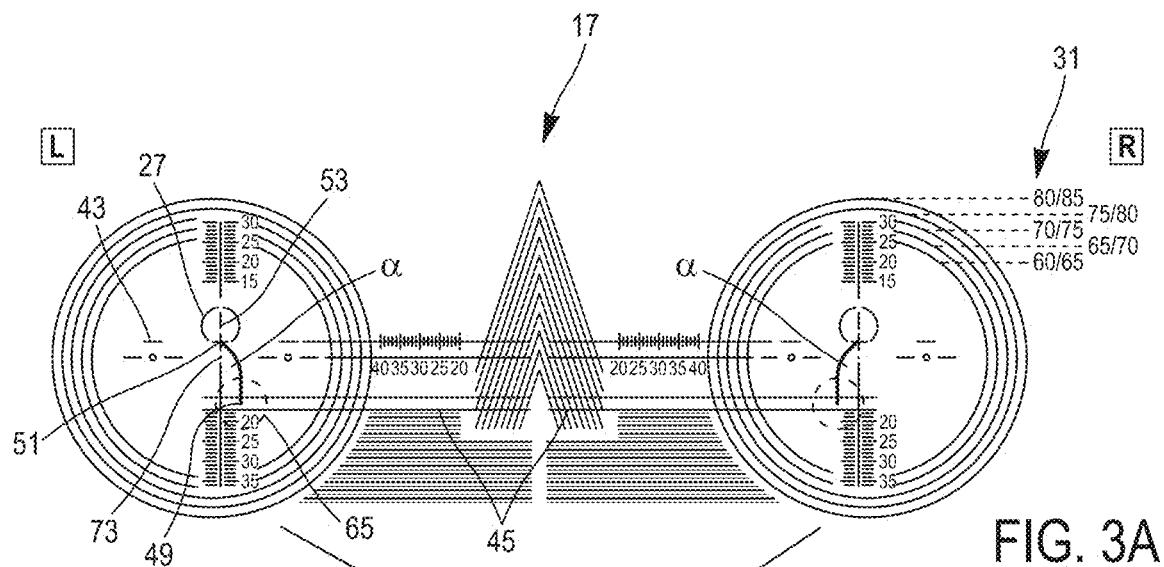
FIG. 3A illustrates a lens fitting card positioned in a first position, for fitting progressive lenses, such as those illustrated in FIG. 2A.

Referring to FIG. 3A, presented herein is a method for transforming a pair of spherical progressive lenses 21, 35 into a set of presbyopic test lenses for mounting into an eyeglasses frame or other lens receiving device, such as those described herein. The method involves providing a lens fitting card 17. The fitting card 17 is illustrated in its normal use position, before being inverted. The fitting card 17 comprises a near vision reference point 49 that is positioned at a predetermined angle "a" from a distance vision reference point 53. In one aspect, the angle between the near vision reference point 49 and the distance vision reference point 53 is at a predetermined angle "a" of between about 110 degrees and about 125 degrees. In particular, the angle is about 115 degrees. The fitting card comprises a distance vision zone 27, which surrounds the distance reference point 53, as well as an Add power section 43. The fitting card 17 further comprises a near vision zone 65, which surrounds the near vision reference point 49. A fitting cross 51 is centered at the bottom portion of the distance vision zone 27. A prizm reference point 73 is positioned just below the fitting cross 51. The pupillary height ("PH") is noted at line 45. The right portion of the fitting card 17 is the mirror image of the left portion of the fitting card 17.

The lens fitting card 17 is used to aid opticians in properly dispensing progressive lenses for patients. The left portion of the fitting card is used to measure a lens to the left of the central portion (as depicted by the central stacked triangular lines) of the fitting card 17. The left portion of the fitting card is noted with an "L," to the upper left of the fitting card. Conversely, the right portion of the fitting card is used to measure a lens to the right of the central portion of the fitting card. The right portion of the lens is noted as "R," to the upper right of the fitting card 17. The fitting card 17 is typically used by placing a lens that is positioned within a lens receiving device, such as a frame, in alignment with the layout chart cross and aligning a center dot over the fitting cross 51. The frame size to be used with the lenses is adequate if the full areas of the distance vision zone and the near vision zone fall within the frame. If the lens does not meet this criteria, a different frame may be chosen to be paired with the lens. In this example, the minimum fitting height of the fitting card is 14 mm. The different diameters 31 of the right lens within the frame are highlighted to the right of the fitting card 17, as indicated by the concentric circles.

Figure 3B:
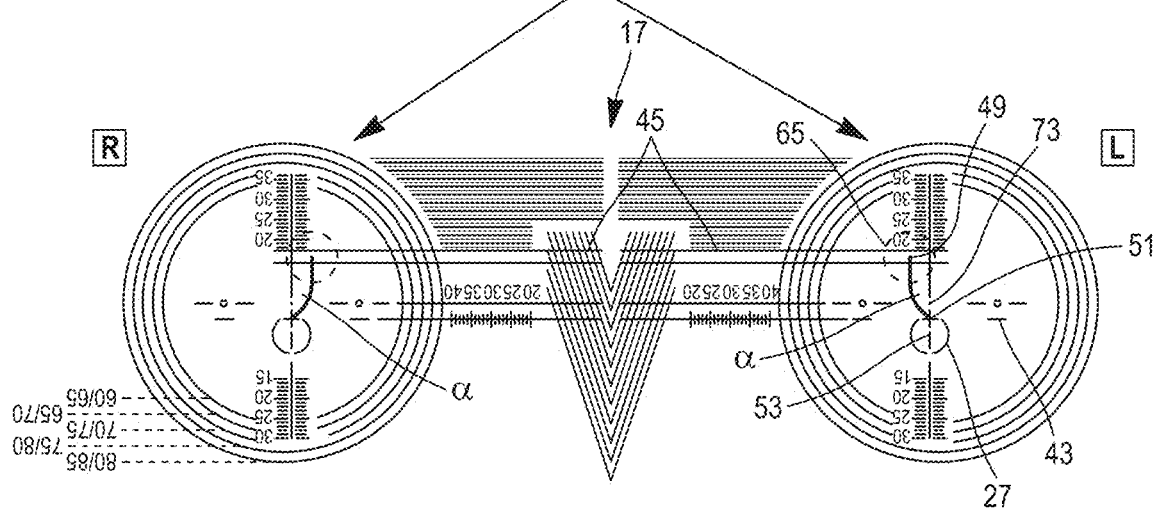
FIG. 3B illustrates the fitting card of FIG. 3A in which the fitting card is inverted and rotated from the first position to a second position.

Referring to FIG. 3B, the "L" and "R" sides of the lens fitting card 17 have been inverted or exchanged, and the fitting card 17 has been rotated 180 degrees. By rotating the fitting card 180 degrees, the basic premise of the invention is illustrated.

Figure 4A:
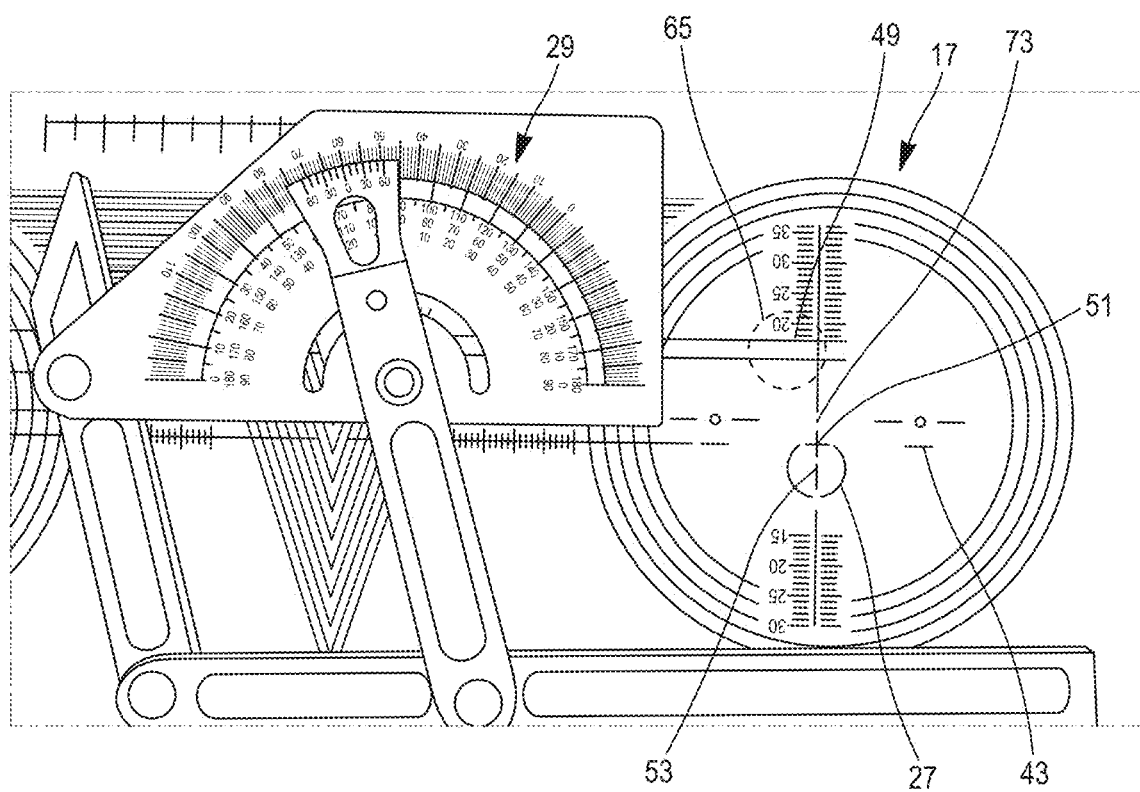
FIG. 4A illustrates a front view of an angle measuring device laid onto the progressive lens fitting card of FIGS. 3A and 3B.
Figure 4B:
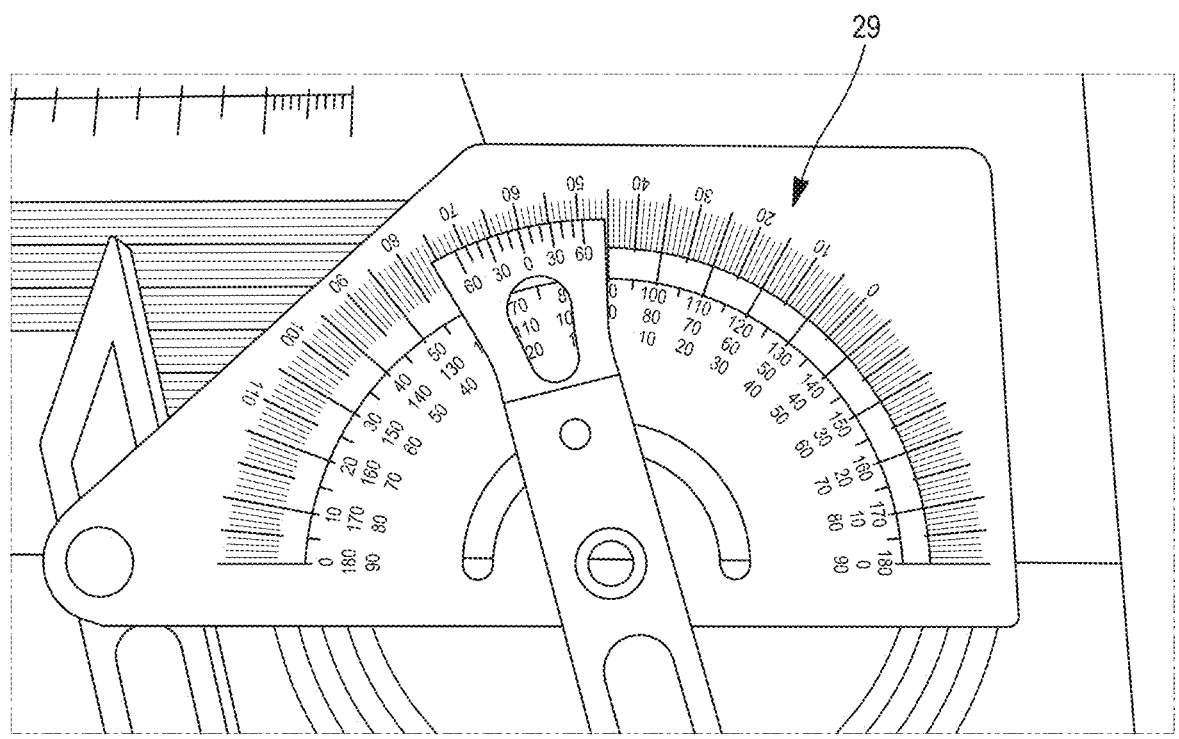
FIG. 4B illustrates a close-up view of the angle measuring device and fitting card of FIG. 4A.

Referring to FIGS. 4A and 4B, a method of measuring the angle between the near vision zone and the distance vision zone is illustrated. An angle measuring device 29 is laid over or on top of a fitting card. The device 29 is used to measure an angle between a distance vision zone and a near vision zone on the lens fitting card. In one aspect the angle measuring device can be a protractor 29, described in U.S. Pat. No. 4,766,675 and UK Patent No. 2,191,593, and incorporated herein by reference, and commercially available from General Tools and Instruments, Inc.

Figure 5:
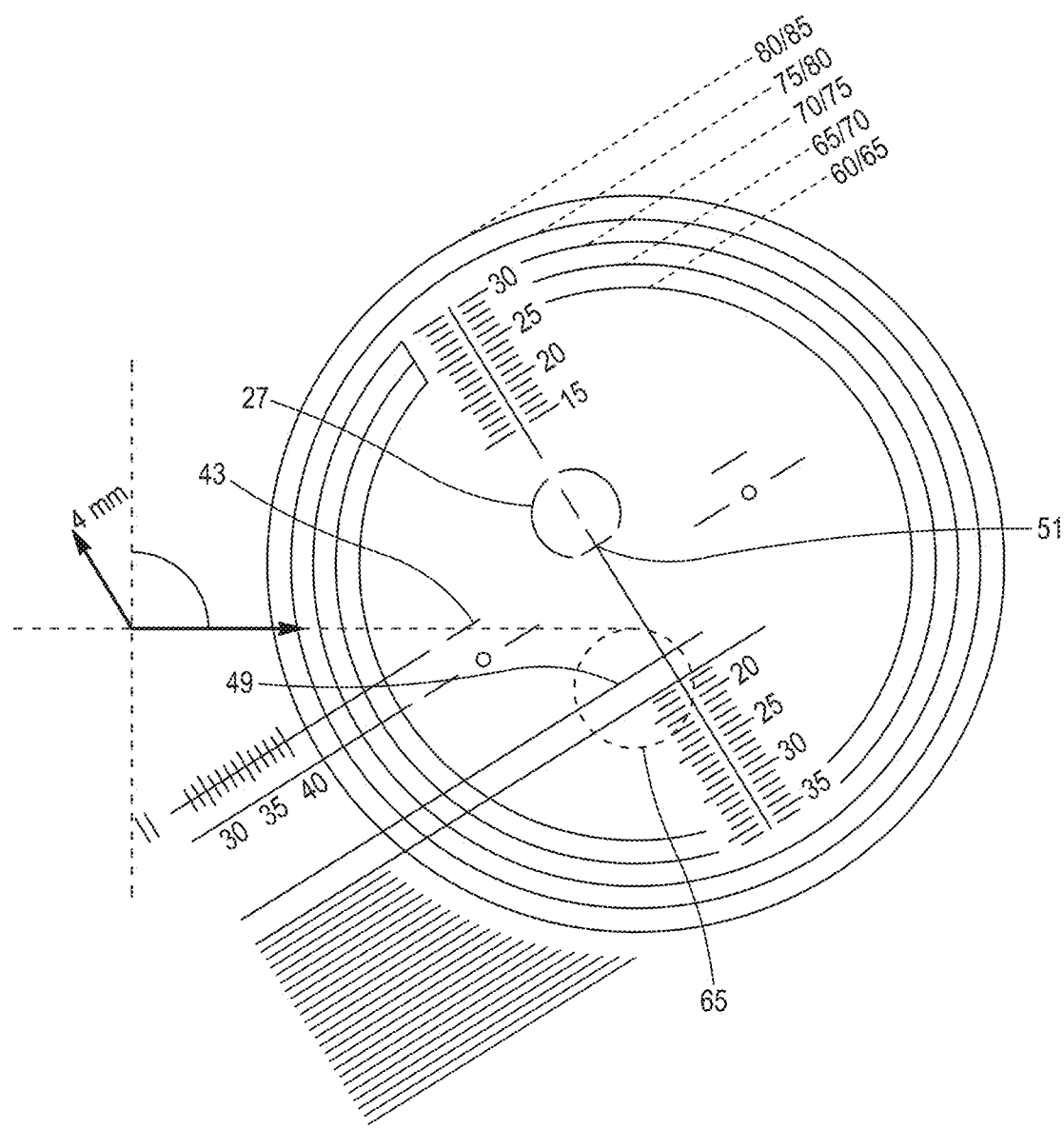
FIG. 5 illustrates a portion of the lens fitting card of FIGS. 4A and 4B, relative to a new lens position and pupillary distance (PD) segment height as a result of re-positioning the lens fitting card from the first position to the second position, referred to above.

Referring to FIG. 5, after the fitting card is re-positioned as described above, the new reading area or near vision zone (formerly the distance vision zone) is rotated to match that of about 115 degrees. The dotted lines become the new reference points for the lens position for the pupillary distance (PD) and segment height (SH). Thus, the fitting card has been rotated and measured such that a wearer viewing a lens in a frame that has been measured using the fitting card 17 will use the distance vision zone (7, 5) as the reading area or near vision zone, instead of the near vision zone (3, 13).

The optical device described herein can be used to demonstrate an optical disorder, such as, but not limited to presbyopia, to a non-presbyope. The method involves demonstrating an optical disorder. The method involves providing two ophthalmic lenses, in particular, progressive lenses, in a first position relative to each other. Each lens comprises a first vision zone and a second vision zone. The first vision zone comprises a distance vision zone that has a distance vision reference point and a power of between about −1.00 Diopters and −4.00 Diopters, and the second vision zone comprises a near vision zone that has a near vision reference point and a power of between about +1.00 Diopters and about +4.00 Diopters. Each lens comprises an Add power of between about +2.00 Diopters and about +3.25 Diopters. The method further involves re-positioning the ophthalmic lenses from a first position to a second position relative to each other, such that the distance vision zone of each lens is viewable by a wearer through the near vision zone and the near vision zone of each lens is viewable by a wearer through the distance vision zone. The method further involves providing the ophthalmic lenses to the wearer. The step of re-positioning further comprises exchanging the ophthalmic lenses and inverting each ophthalmic lens such that the distance vision zone has a plano power, and the near vision zone has a power of between about −1.00 Diopters and about −4.00 Diopters. The step of re-positioning also involves positioning the optical article such that the near vision reference point is between about 100 degrees and 125 degrees relative to the distance vision reference point. The method further involves providing the ophthalmic lenses to a non-presbyope wearer. The method involves demonstrating presbyopia to the non-presbyope wearer. The method further involves measuring a facial reaction of the non-presbyope wearer in response to the wearer viewing the distance vision zone through the near vision zone and the near vision zone through the distance vision zone. The method may further involve recording a perception of the wearer via a survey, visual observation, or computerized facial recognition program.

The invention described herein could be used by educators, opticians, optometrists, and/or ophthalmologists that are not affected by presbyopia to simulate the effects experienced by a lens wearer with presbyopia.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention. It will be appreciated that one or more of the above embodiments may be combined with one or more of the other embodiments, unless explicitly stated otherwise. The invention illustratively disclosed herein suitably may be practiced in the absence of any element or step that is not specifically disclosed or claimed.

Furthermore, no limitations are intended to the details of construction, composition, design, or steps herein shown, other than as described in the claims.

The invention claimed is:

1. A method for demonstrating an optical disorder, wherein the method comprises:
   a) providing two ophthalmic lenses in a first position relative to each other, wherein each lens comprises a first vision zone and a second vision zone, wherein the first vision zone comprises a distance vision zone having a distance vision reference point and a power of between about −1.00 Diopters and about −4.00 Diopters, and the second vision zone comprises a near vision zone having a near vision reference point and a power of between about +1.00 Diopters and about +4.00 Diopters, and wherein each lens comprises an Add power of between about +2.00 Diopters and about +3.25 Diopters and having the wearer view through the two ophthalmic lenses;
   b) re-positioning the ophthalmic lenses to a second position relative to each other, such that the distance vision zone of each lens is viewable by a wearer through the near vision location of the near vision zone as set forth in step a) and the near vision zone of each lens is viewable by a wearer through the distance vision location of the distance vision zone as set forth in step a); and
   c) providing the ophthalmic lenses to the wearer and having the wearer view through the two ophthalmic lenses as re-positioned to thereby compare the two viewings and demonstrate an optical disorder.

2. The method of claim 1, wherein the method of providing further comprises providing progressive lenses.

3. The method of claim 1, wherein the method further comprises positioning the near vision reference point such that an angle between the near vision reference point and the distance vision reference point with respect to a center dot of each lens is between about 100 degrees and 125 degrees.

4. The method of claim 1, wherein the method further comprises providing the ophthalmic lenses to a non-presbyope wearer.

5. The method of claim 4, wherein the method further comprises demonstrating presbyopia to the non-presbyope wearer.

6. The method of claim 5, wherein the method further comprises measuring a facial reaction of the non-presbyope wearer in response to the distance vision zone of each lens being viewable by the wearer through the near vision location of the near vision zone as set forth in step a) and the near vision zone of each lens being viewable by the wearer through the distance vision location of the distance vision zone as set forth in step a).

* * * * *